UNITED STATES PATENT OFFICE.

JAMES N. B. DE POUILLY, OF NEW ORLEANS, LOUISIANA.

IMPROVEMENT IN COMPOSITIONS FOR ARTIFICIAL STONE.

Specification forming part of Letters Patent No. 123,090, dated January 30, 1872.

*To all whom it may concern:*

Be it known that I, J. N. B. DE POUILLY, of New Orleans, in the parish of Orleans and State of Louisiana, have invented a new and Improved Compound for Mortar; and I do hereby declare that the following is a full, clear, and exact description of the same.

The nature of my invention relates to a new combination of materials to form a mortar, or an artificial preparation resembling stone, and suitable for constructing walls of buildings, balusters, lintels, sills, cornices, moldings, gutters, &c. The invention more especially consists in the use of the hydrate of lime, in combination with sulphate of lime and water of baryta, for effecting the instantaneous agglomeration and solidification of earthy materials employed in forming the mortar.

The following are the materials I employ, and the best proportion of the same: Sand, gravel, or common earth, one part; lime, (fresh,) one-fourth part; pozzolana, (natural or artificial,) one-tenth to one-fifteenth part; sulphate of lime, one-twentieth part; water of baryta in quantity sufficient to the formation of the hydrate, but varying according to the condition of the pozzolana and lime.

To unite these into a homogeneous mass I first triturate the sand or gravel and lime in a suitable vessel, and mix the water of baryta with them during the operation, and, as soon as the hydrate begins to form, but while the mixture is yet pulverulent, I add the sulphate of lime and pozzolana, and directly cease the trituration. The mixture, having now become a sort of paste, is transferred to molds to be compressed and shaped into blocks or any desired forms. Subsequent exposure for two or three hours in the air renders them hard and firm.

What I claim is—

The combination of water of baryta and sulphate of lime with lime and with suitable earthy materials, to form an artificial preparation of stone.

New Orleans, October 28, 1869.

JAS. N. B. DE POUILLY.

Witnesses:
CHARLES DE GRUY,
ADOLFO SUARI.